US012633170B2

(12) United States Patent
Rhodes et al.

(10) Patent No.: US 12,633,170 B2
(45) Date of Patent: May 19, 2026

(54) METHOD AND SYSTEM FOR AUTOMATED DETECTION AND INTERPRETATION OF ANOMALIES

(71) Applicant: The Boeing Company, Arlington, VA (US)

(72) Inventors: Peter Geoffrey Rhodes, Bridgeton, MO (US); Li Chun Chang, Mount Pleasant, SC (US); James Y. Lee, La Habra, CA (US)

(73) Assignee: The Boeing Company, Arlington, VA (US)

( * ) Notice: Subject to any disclaimer, the term of this patent is extended or adjusted under 35 U.S.C. 154(b) by 54 days.

(21) Appl. No.: 18/759,416

(22) Filed: Jun. 28, 2024

(65) Prior Publication Data

US 2026/0004615 A1    Jan. 1, 2026

(51) Int. Cl.
*G07C 5/00*        (2006.01)
*B64D 45/00*      (2006.01)

(52) U.S. Cl.
CPC ............. *G07C 5/006* (2013.01); *B64D 45/00* (2013.01); *B64D 2045/0085* (2013.01)

(58) Field of Classification Search
None
See application file for complete search history.

(56) References Cited

U.S. PATENT DOCUMENTS 9,020,689 B2 *    4/2015    Smith ................ G05B 23/0254
                                                              703/2
2020/0377233 A1    12/2020    Harvey et al.

FOREIGN PATENT DOCUMENTS

EP            3819656 A1      5/2021
EP            4371889 A1      5/2024

OTHER PUBLICATIONS

European Patent Office Extended Search Report, dated Aug. 25, 2025, regarding Application No. EP25180870.5, 8 pages.
Spexet Ann Marie et al: "Data Pipeline Considerations for Aviation Maintenance", 2023 IEEE Aerospace Conference, IEEE, Mar. 4, 2023 (Mar. 4, 2023), pp. 1-7, XP034341727, DOI: 10.1109/AERO55745.2023.10115656 [retrieved on May 15, 2023] * 3. Data From Wing to Hangar and Back, 2nd para.; p. 2 *.

* cited by examiner

*Primary Examiner* — Abdhesh K Jha
(74) *Attorney, Agent, or Firm* — Yee & Associates, P.C.

(57)            ABSTRACT
A computer-implemented method for aircraft maintenance is provided. The method includes monitoring sections and components of an aircraft using sensors. The method includes detecting, by the sensors, anomalies in the aircraft. The method includes transmitting, responsive to the detection, real-time data from the sensors to a computer having an artificial intelligence (AI) algorithm. The method includes analyzing the data with the AI algorithm to determine characteristics of the anomalies. The method includes transmitting, in response to the determination, reports to a pilot and the computer.

15 Claims, 7 Drawing Sheets

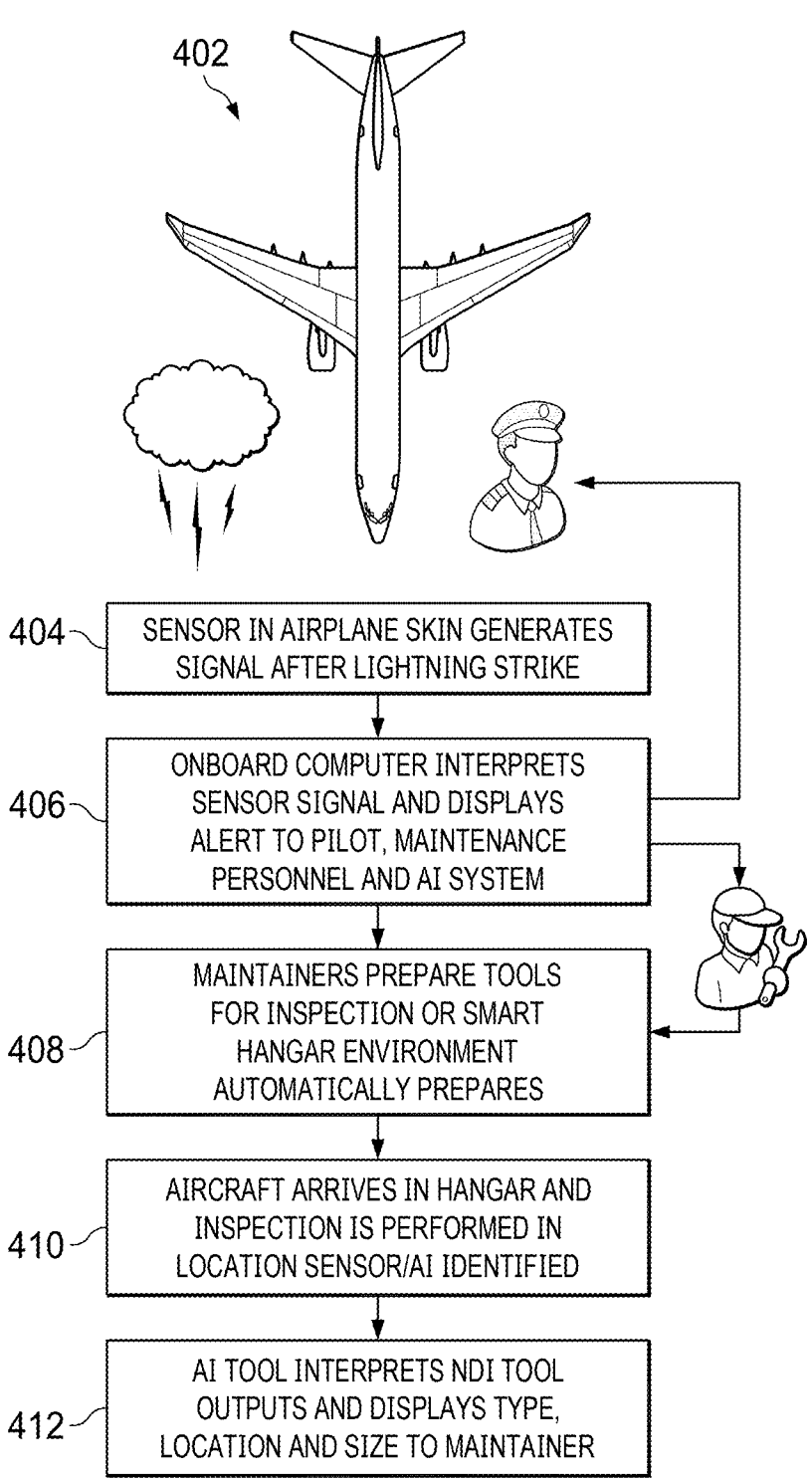

402

404 — SENSOR IN AIRPLANE SKIN GENERATES SIGNAL AFTER LIGHTNING STRIKE

406 — ONBOARD COMPUTER INTERPRETS SENSOR SIGNAL AND DISPLAYS ALERT TO PILOT, MAINTENANCE PERSONNEL AND AI SYSTEM

408 — MAINTAINERS PREPARE TOOLS FOR INSPECTION OR SMART HANGAR ENVIRONMENT AUTOMATICALLY PREPARES

410 — AIRCRAFT ARRIVES IN HANGAR AND INSPECTION IS PERFORMED IN LOCATION SENSOR/AI IDENTIFIED

412 — AI TOOL INTERPRETS NDI TOOL OUTPUTS AND DISPLAYS TYPE, LOCATION AND SIZE TO MAINTAINER

702 — SPECIFICATION AND DESIGN

704 — MATERIAL PROCUREMENT

706 — COMPONENT AND SUBASSEMBLY MANUFACTURING

708 — SYSTEM INTEGRATION

710 — CERTIFICATION AND DELIVERY

712 — IN SERVICE

714 — MAINTENANCE AND SERVICE

800

AIRCRAFT

802 — AIRFRAME        INTERIOR — 806

SYSTEMS

PROPULSION SYSTEM        ELECTRICAL SYSTEM 808        812                810        814

HYDRAULIC SYSTEM        ENVIRONMENTAL SYSTEM

804

METHOD AND SYSTEM FOR AUTOMATED DETECTION AND INTERPRETATION OF ANOMALIES

BACKGROUND INFORMATION

1. Field

The present disclosure relates generally to detection of anomalies and irregularities, and more specifically to a method and system for automated detection and interpretation of anomalies in various sections and components of an aircraft.

2. Background

Aircrafts in-flight are frequently exposed to various hazards, including lightning strikes, object collisions, and other incidents that can lead to anomalies or inconsistencies in various sections and components of the aircraft. Despite advancements in aviation technology, pilots and maintenance personnel often remain unaware of such occurrences until routine visual inspections are conducted. However certain areas of aircraft exteriors are subject to infrequent visual inspections, sometimes occurring only once a year. For instance, the top surface of an aircraft's fuselage may go unchecked for extended periods, increasing the likelihood of undetected damage propagation. Interior components and sections of the aircraft are inspected even more rarely despite the potential for anomalies to lurk in the aircraft.

In current aircraft maintenance protocol, the detection of anomalies heavily relies on manual visual inspections conducted by maintenance personnel. This approach is reactive, time-consuming and prone to human error. Maintenance personnel are required to physically inspect areas and components of the aircraft, searching for any signs of anomalies. Moreover, the detection of anomalies necessitates human intervention, leading to additional delays and potential aircraft grounding for repair scheduling.

The inefficiencies inherent in the manual inspection process underscore the need for a more efficient and automated approach to detection, interpretation and repair of anomalies.

SUMMARY

Illustrative embodiments provide a computer-implemented method for aircraft maintenance. The method includes monitoring sections and components of an aircraft using sensors and detecting, by the sensors, anomalies in the aircraft. The method includes transmitting, responsive to the detection, real-time data from the sensors to a computer having an artificial intelligence (AI) algorithm. The method includes analyzing the data with the AI algorithm to determine characteristics of the anomalies. The method includes transmitting, in response to the determination, reports to a pilot and the computer.

In an illustrative embodiment, the computer is based on the ground, in the cloud, in the aircraft or in a satellite.

In an illustrative embodiment, the AI algorithm utilizes the real-time data and historical information to determine the characteristics of the anomalies.

In an illustrative embodiment, the method includes utilizing the AI algorithm to analyze the reports to determine availability of a smart hangar for aircraft inspection, and based on the availability of the smart hangar, determining a maintenance schedule for the aircraft. The method includes preparing smart inspection tools for deployment based on determined smart hangar availability.

In an illustrative embodiment, the sensors include at least one of a piezoelectric sensor, a Micro-Electro-Mechanical System (MEMS), an electromagnetic (EM) sensor, a LIDAR, a camera, a shearography sensor or a nanorobot.

Another illustrative embodiment provides a system for aircraft maintenance. The system includes a storage device configured to store program instructions. The system includes one or more processors operably connected to the storage device and configured to execute the program instructions to cause the system to: monitor sections and components of an aircraft using sensors; detect, by the sensors, anomalies in the aircraft; transmit, responsive to the detection, real-time data from the sensors to a computer having an artificial intelligence (AI) algorithm; analyze the data with the AI algorithm to determine characteristics of the anomalies; and transmit, in response to the determination, reports to a pilot and the computer. The computer is based on the ground, in the cloud, in the aircraft or in a satellite.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 pictorially illustrates a process in accordance with an illustrative embodiment;

DETAILED DESCRIPTION

The illustrative embodiments address limitations of current aircraft maintenance protocols. Although the illustrative embodiments are described with reference to aircraft maintenance and repair, the embodiments can be implemented in other industries (e.g., automotive, transportation, healthcare, maritime). The illustrative embodiments provide an automated approach to detection, interpretation, maintenance, and repair of anomalies. The disclosed embodiments utilize onboard sensors and an artificial intelligence (AI) algorithm for predictive, pro-active detection and interpretation of anomalies. Also, the disclosed embodiments provide communication tools and automation to reduce manual effort and improve efficiency.

Figure 1:
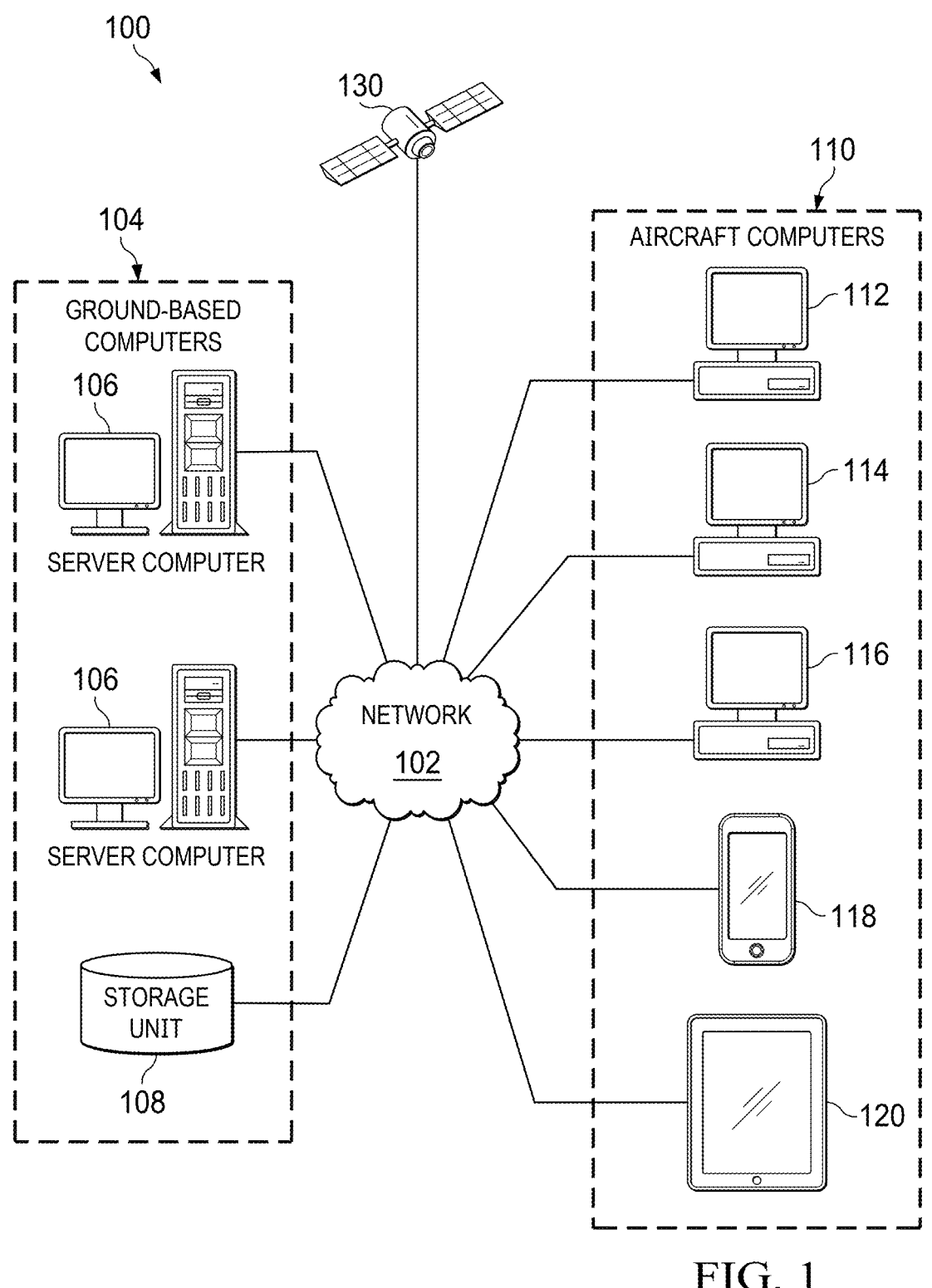
FIG. 1 is a pictorial representation of a system in which illustrative embodiments may be implemented.

With reference to FIG. 1, a pictorial representation of system 100 is depicted in which illustrative embodiments may be implemented. System 100 is a network of computers in which the illustrative embodiments may be implemented. System 100 includes ground-based computers 104 and aircraft-based computers 110 to facilitate an automated method and system for detection, interpretation, maintenance and repair of anomalies.

System 100 contains network 102, which is the medium used to provide communications links between ground-based computers 104 and aircraft-based computers 110. Network 102 may include connections, such as wire, wireless link, or fiber optic cables. Ground-based computers 104 and aircraft-based computers 110 may also rely on satellite communication link 130 in addition to network 102 for bidirectional communication.

Ground-based computers 104 may include server computers 106 and storage unit 108 which connect to network 102. In the depicted example, server computers 106 provide information, such as boot files, operating system images, and applications to aircraft-based computers 110.

Aircraft-based computers 110 can be, for example, computers, workstations, or network computers. As depicted, aircraft computers 110 include computers 112, 114, and 116. Aircraft-based computers 110 can also include other types of devices such as mobile phone 118 and tablet 120.

Program code located in system 100 can be stored on a computer-recordable storage medium and downloaded to a data processing system or other device for use. For example, the program code can be stored on a computer-recordable storage medium on server computers 106 and storage unit 108 and downloaded to aircraft-based computers 110 over network 102 for use. Also, the program code can be stored on a storage medium within aircraft-based computers 110.

In the illustrative example of FIG. 1, network 102 can include the Internet representing a worldwide collection of networks and gateways that use the Transmission Control Protocol/Internet Protocol (TCP/IP) suite of protocols to communicate with one another. System 100 also may be implemented using different types of networks. For example, network 102 can be comprised of an intranet, a local area network (LAN), a metropolitan area network (MAN), or a wide area network (WAN). FIG. 1 is intended as an example, and not as an architectural limitation for the different illustrative embodiments.

Figure 2:
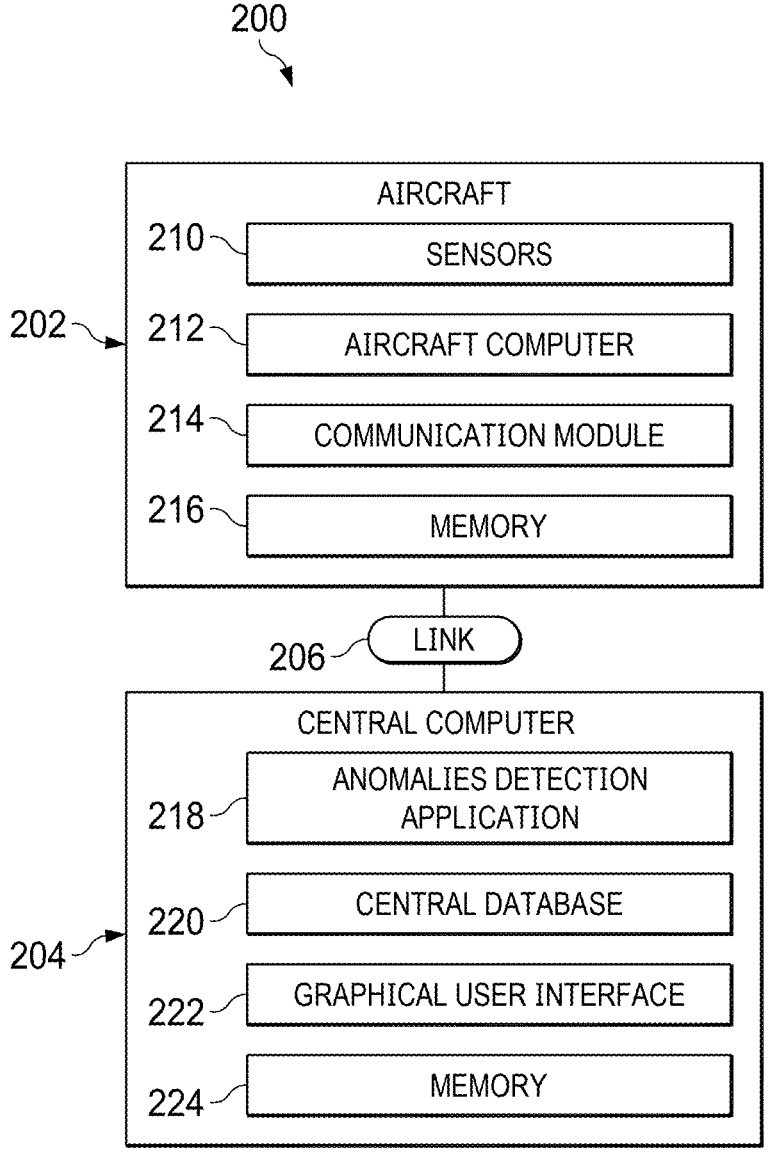
FIG. 2 is a functional block diagram of a system for detection, interpretation, maintenance, and repair of anomalies in accordance with an illustrative embodiment.

FIG. 2 is a functional block diagram of system 200 for detection, interpretation, maintenance, and repair of anomalies. System 200 includes aircraft 202 which bi-directionally communicates with central computer 204 via communication link 206. Communication link 206 may include wireless link, satellite link and/or wired link (e.g., Internet, fiber optic cable).

Aircraft 202 includes onboard sensors 210 configured to detect anomalies or inconsistencies in various sections and components of aircraft 202. For example, sensors 210 may be installed to detect anomalies in various sections such as outer surface, sub-surface, interior, engine and cargo hold of aircraft 202. These onboard sensors may comprise a variety of advanced technologies including, for example, piezoelectric sensors, Micro-Electro-Mechanical Systems (MEMS), cameras, Light Detection and Ranging (LIDAR), nano robots, millimeter wave technology, shearography sensors and other types of sensors. The sensors may also include electromagnetic (EM) sensors which operate at different frequencies including but not limited to millimeter wavelengths.

When an anomaly occurs during an in-flight event such as a lightning strike, object collision or atmospheric disturbance, onboard sensors 210 within aircraft 202 detect the anomaly. Incidents involving passengers and flight crew are also considered anomalies. Sensors 210 continuously monitor various sections and components of aircraft 202. Upon detecting any deviation from the norm, sensors 202 transmit real-time data to pilot and central computer 204.

In some example embodiments, system 200 may include aircraft-based computer 212 configured to bidirectionally communicate with central computer 204 via communication link 206. Although system 200 is illustrated to include aircraft-based computer 202 and central computer 204, system 200 can be configured to include only a single central computer (e.g., central computer 204). Such a central computer can be based on the ground, in the cloud (e.g., cloud-based server) or in a satellite.

Aircraft 202 includes communication module 214 which establishes communication between aircraft 202 and central computer 204. Communication module 214 enables access to other components within aircraft 202 and central computer 204.

Aircraft 202 includes memory 216 configured to store sensor outputs and data generated aircraft-based computer 212. Memory 216 can be a hard disk drive, a solid state drive, a RAM, a ROM, or a flash memory.

Central computer 202 can, for example, be a server computer, a cluster of computers or a quantum computer. Central computer 204 includes anomalies detection/interpretation application 218. Anomalies detection/interpretation application 218 includes an artificial intelligence (AI) algorithm which analyzes and interprets anomalies and inconsistencies.

In some example embodiments, application 218 integrates augmented reality (AR) and mixed reality (MR) technologies and other related technologies (also referred to as digital twin). The AR and MR capabilities and digital twin assist in the detailed analysis and accurate interpretation of anomalies and inconsistencies. Maintenance personnel can leverage AR and MR technologies during service and repair process. By utilizing AR and MR technologies, maintenance personnel can visualize complex issues, thereby enhancing the efficiency and effectiveness in addressing anomalies and inconsistencies.

Utilizing historical and statistical data, anomalies detection/interpretation application 218 analyses and interprets the sensor outputs to determine the precise type, location, and size of the anomaly, while the aircraft remains airborne. Based on the analysis and interpretation by application 218, central computer 204 relays alerts and relevant information to pilot and to ground-based maintenance personnel to prepare for maintenance, repair and further inspection as needed. If an anomaly involves incidents involving flight crew and passengers, central computer 204 may send alerts to healthcare service providers (e.g., ambulance, first responders, hospital) and/or law enforcement agencies, if necessary.

In an illustrative embodiment, application 218 determines optimal repair time and location, if needed, based on the severity of anomaly and aircraft schedule. This proactive and predictive approach minimizes aircraft downtime and maximizes fleet availability, ultimately enhancing overall operational effectiveness.

Central computer 204 includes database 220 which can store historical and statistical data associated with anomalies and inconsistencies. Application 218 can access data stored in database 220 to interpret sensor outputs to determine the precise type, location, size and severity of the anomaly, while the aircraft remains airborne.

Central computer 204 includes graphical user interface 222 which provides maintenance personnel with tools to interact with both the aircraft and database 220. Graphical user interface 222 offers a dashboard that displays real-time status updates, anomaly reports, and maintenance recommendations. Graphical user interface 222 allows maintenance personnel to upload, change, delete, alter or update data.

Central computer 204 may include memory 224 configured to store sensor outputs and data generated central computer 204. Memory 224 can be a hard disk drive, a solid state drive, a RAM, a ROM, or a flash memory.

Figure 3:
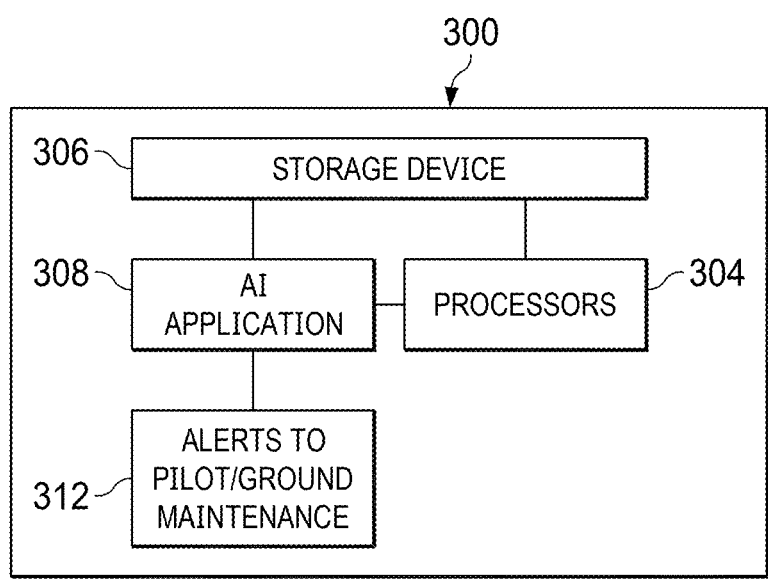
FIG. 3 is a functional block diagram of a system for detection and interpretation of anomalies using AI algorithms.

FIG. 3 is a functional block diagram of system 300 for detection and interpretation of anomalies utilizing AI algorithms in accordance with an illustrative embodiment. System 300 provides an efficient and automated process to reduce manual effort and improve productivity. System 300 can be implemented within central computer 204. In other example embodiments, system 300 can be implemented in aircraft 202.

When an anomaly occurs during an in-flight event, onboard sensors 210 within the aircraft detect the anomaly. Incidents involving passengers and flight crew are also considered anomalies. Upon detecting any deviation from the norm, such as a dent, crack, surface irregularity or in-flight incidents, sensors 210 transmit real-time data to system 300. Processors 304 serves as the central computing unit responsible for executing instructions and processing data. Processors 304 receive, manage, and manipulate the real-time sensor data transmitted by the onboard sensors 210.

System 300 includes storage device 306 coupled to processor 304. Storage device 306 is configured to store data generated by sensors 210. Storage device 306 may also store historical and/or statistical data relating to detection and interpretation of anomalies. Historical and statistical data play a crucial role in the detection and interpretation of anomalies. Historical data refers to a collection of past observations, events, or measurements related to instances of anomalies or incidents, and operation and maintenance of aircraft. Historical data encompasses a wide range of parameters, including sensor readings, maintenance records, and flight data. Statistical data involves the analysis of past observations, events, or measurements related to instances of anomalies or incidents, and operation and maintenance of aircraft to derive meaningful insights and patterns.

System 300 includes AI application 308 coupled to processor 304 and storage device 306. AI application 308 includes algorithm configured to analyze and interpret sensor data utilizing historical and statistical data. By utilizing historical and statistical data, AI application 308 can identify patterns, trends, and recurring anomalies that may be indicative of underlying issues or potential risks. For example, historical data may reveal common failure modes in specific aircraft components or environmental conditions that contribute to anomalies.

In an illustrative embodiment, AI application 308 is a computational algorithm that learns patterns and relationships from data to make predictions or decisions. AI application 308 can be programmed or configured to perform the steps of analysis and synthesis. AI application 308 is trained using a set of input data and corresponding output labels to learn the underlying patterns in the data. During a training phase, AI application 308 may employ a learning algorithm, such as gradient descent or stochastic gradient descent, to iteratively adjust its internal parameters or weights based on the input data and output labels. Once the training phase is complete, AI application 308 generates a trained model or mapping function that captures the relationships between the input data and output labels learned from the training data. The trained model or mapping function essentially represents a mathematical approximation of the underlying patterns and relationships in the data. When presented with new input data, the trained model or mapping function is utilized to make predictions or decisions. Based on the interpretation of sensor outputs, AI application 308 generates alerts 312 which are relayed to pilot and ground-based maintenance personnel. If the anomalies are due to in-flight incidents involving flight crew and passengers, alerts may be sent to healthcare providers (first responder, hospitals) and/or law enforcement agencies, if necessary.

In some example embodiments, AI application 308 integrates augmented reality (AR) and mixed reality (MR) technologies and other related technologies which are referred to as "digital twin." Maintenance personnel can leverage AR and MR technologies and digital twin during service and repair process. By utilizing AR and MR technologies, maintenance personnel can visualize complex issues, thereby enhancing the efficiency and effectiveness in addressing anomalies and inconsistencies. AR and MR technologies can be implemented in a smart hangar, smart tools, an AI factory or any repair/maintenance facility.

FIG. 4 pictorially illustrates a process 400 in accordance with an illustrative embodiment. When a physical anomaly occurs in-flight, sensors within aircraft 402 generate real-time data 404. Next, computer 212 interprets sensor data and relays alerts and reports 406 to pilot and ground-based computer 204. In other example embodiments, onboard sensors directly send alerts and data to pilot and central computer 204. In response to the alerts and reports, maintenance personnel prepare smart tools and/or a smart hangar for inspection 408. If smart tools and smart hangars are not available, maintenance personnel use the sensor data to plan and optimize maintenance/repair using other tools.

As the aircraft arrives in a hangar, smart tools, including drones equipped with high-resolution cameras, advanced sensors, and X-ray machines, are strategically deployed 410 to inspect the identified anomalous area. These smart tools conduct a comprehensive examination using a variety of techniques, including visual inspection, ultrasound scanning, shearography, millimeter wave technologies, electromagnetic (EM) sensors, LIDAR, camera and other optical technologies and X-ray imaging, to provide an assessment of the anomaly's extent and severity. The EM sensors can operate at different frequencies including but not limited to millimeter wavelengths.

Next, AI algorithm in application 218 interprets data 412 generated by the smart tools to determine the precise type, location, size, nature and severity of the anomaly. In some example embodiments, application 218 integrates augmented reality (AR) and mixed reality (MR). By utilizing AR and MR technologies (digital twin), maintenance personnel in a smart hangar or an AI factory can visualize the precise type, location, size, nature and severity of the anomaly, thereby enhancing the efficiency and effectiveness in addressing anomalies and inconsistencies.

Figure 5:
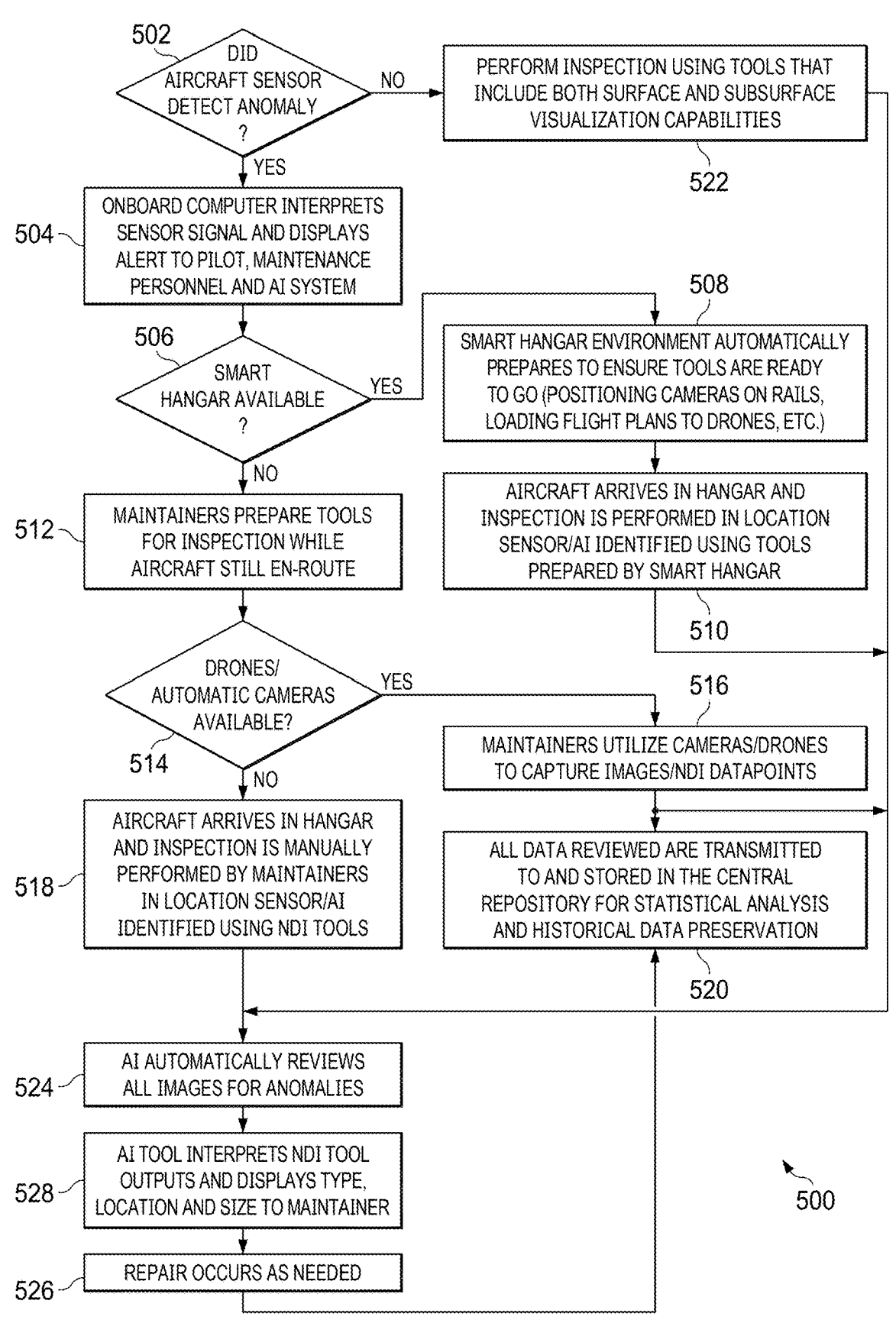
FIG. 5 is a flowchart of a process in accordance with an illustrative embodiment.

FIG. 5 is a flowchart of process 500 for detection, interpretation, maintenance and repair of anomalies in accordance with an illustrative embodiment. Although process 500 is described with reference to aircraft maintenance and repair, the process can be implemented in other industries (e.g., automotive, transportation, healthcare, maritime).

At block 502, aircraft-based computer 202 determines if onboard sensors detected any anomalies in the aircraft. For example, real-time data generated by onboard sensors may indicate the detection of anomalies.

If any anomalies are detected, at block 504, application 212 within aircraft-based computer 202 interprets sensor data and relays alerts and reports to pilot and ground-based computer 204. At block 506, in response to the alerts and reports, ground-based computer 204 determines if any smart hangar is available. In an example embodiment, a smart hangar is an internet of things (IoT) based hangar which includes integrated tools such as cameras on rails, pressure sensors, drones that are prepositioned for inspection and maintenance. If a smart hangar is available, at block 508, a smart hangar is prepared so that smart tools are ready to inspect the aircraft on arrival. Such preparation may include positioning cameras on rails and loading flight plans into drones. At block 510, when the aircraft arrives in the hangar, smart tools are deployed to inspect the identified anomalous areas. The smart tools may include drones equipped with high-resolution cameras, advanced sensors, and X-ray machines. These smart tools conduct an examination using a variety of techniques, including visual inspection, ultrasound scanning, shearography, and X-ray imaging, to provide an assessment of the anomaly's extent and severity. At this stage, AI algorithm within computer 204 interprets data generated by the smart tools to determine the precise type, location, size and severity of the anomalies.

If a smart hangar is not available, at block 512, maintenance personnel prepare tools for inspection while the aircraft is in-flight. At block 514, computer 204 determines if drones and/or automatic cameras are available for inspection. In some example embodiments, maintenance personnel can determine availability of smart tools (e.g., drones, cameras, etc.). If computer 204 is unable to determine availability of smart tools, maintenance personnel can be alerted by computer 204 and requested to determine the availability. If drones and/or automatic cameras are available, at block 516, maintenance personnel utilize drones and cameras to acquire images of the anomalous locations identified by onboard sensors and aircraft-based computer 202 using AI algorithm. If drones and/or automatic cameras are unavailable, at block 518, maintenance personnel perform manual inspection of areas identified by onboard sensors and aircraft-based computer 202. At block 520, data and images generated by cameras and drones are stored in a database within ground-based computer 204.

If onboard sensors did not detect any anomalies, at block 522, maintenance personnel perform aircraft inspection using tools. These tools are configured to inspect various sections, areas and components of the aircraft. At block 524, images and other data acquired during inspections are reviewed and analyzed using AI algorithm within computer 204. At block 526, repair work is performed as needed by maintenance personnel. At block 528, outputs from all smart tools, drones and cameras as well as relevant reports and alerts are displayed on graphical user interface 218.

Figure 6:
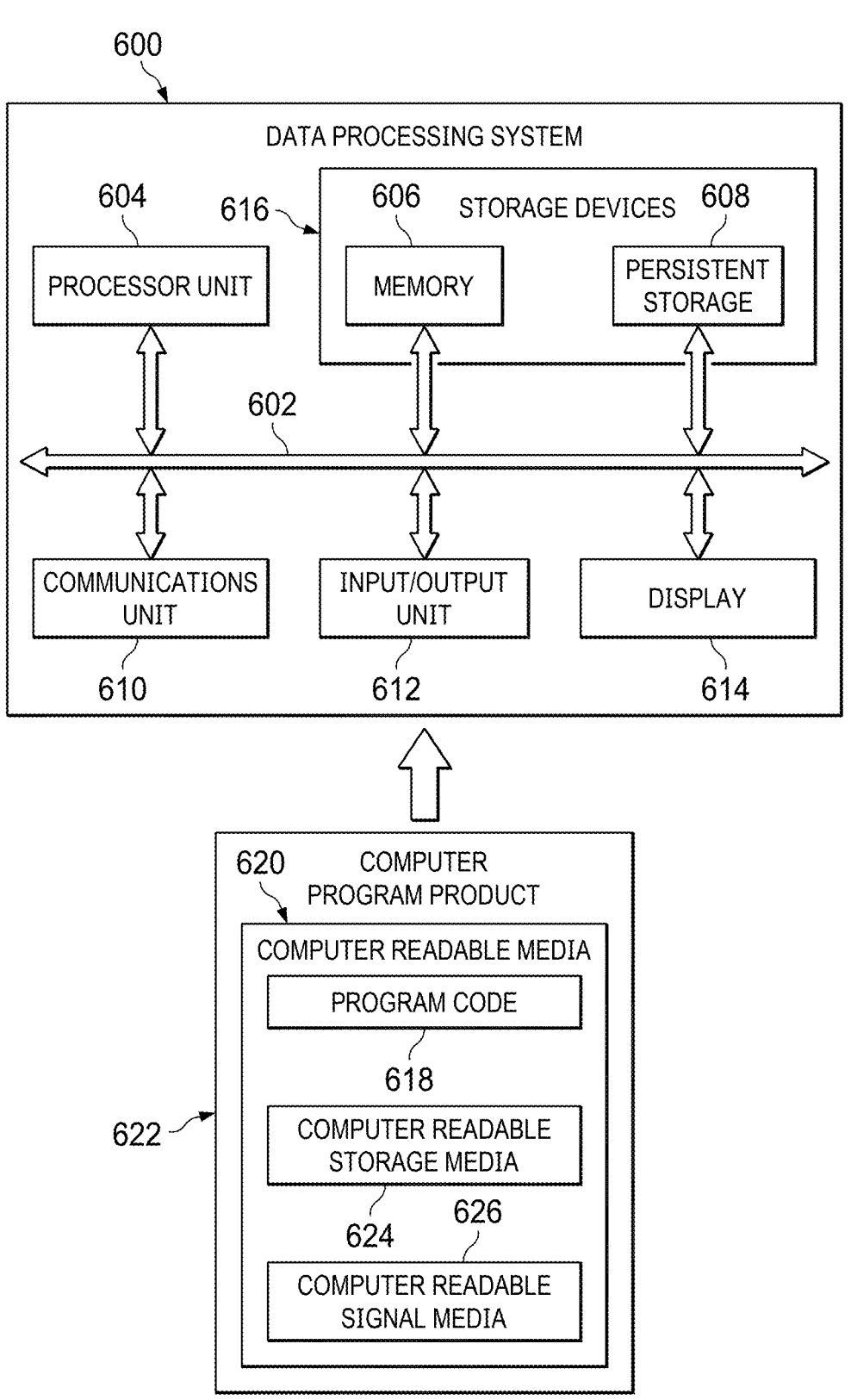
FIG. 6 illustrates a block diagram of a data processing system in accordance with an illustrative embodiment.

Turning now to FIG. 6, an illustration of a block diagram of a data processing system is depicted in accordance with an illustrative embodiment. Data processing system 600 may be used to implement aircraft-based computer 202 and ground-based computer 204. In this illustrative example, data processing system 600 includes communications framework 602, which provides communications between processor unit 604, memory 606, persistent storage 608, communications unit 610, input/output unit 612, and display 614. In this example, communications framework 602 may take the form of a data bus.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (GPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606. These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618.

Alternatively, program code 618 may be transferred to data processing system 600 using computer-readable signal media 626. Computer-readable signal media 626 may be, for example, a propagated data signal containing program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Figure 7:
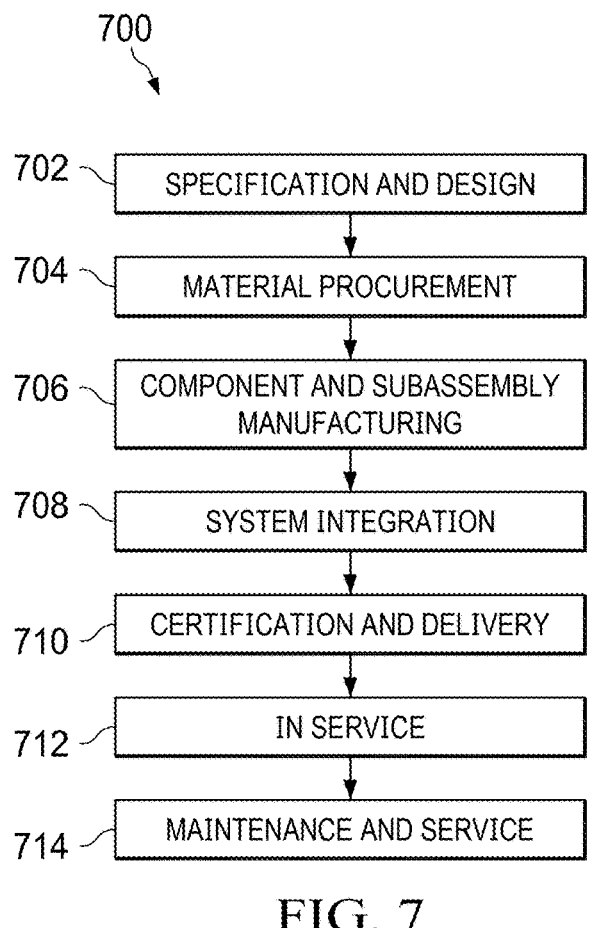
FIG. 7 illustrates manufacturing and service of an aircraft in accordance with an illustrative embodiment.
Figure 8:
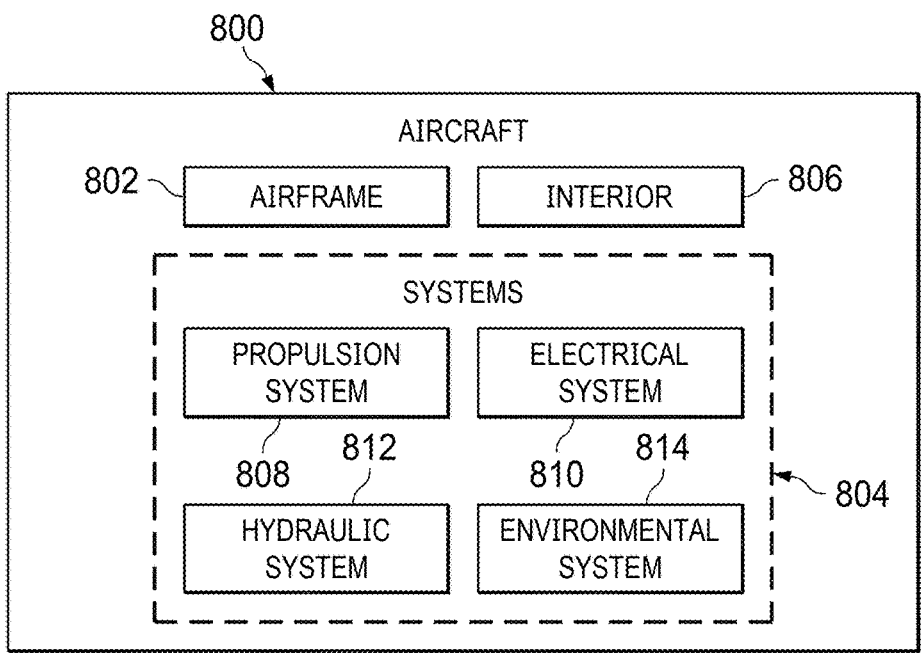
FIG. 8 illustrates sections and systems of an aircraft.

Illustrative embodiments of the disclosure may be described in the context of aircraft manufacturing and service method 700 as shown in FIG. 1 and aircraft 800 as shown in FIG. 8. Turning to FIG. 7, an illustration of an aircraft manufacturing and service method is depicted in accordance with an illustrative embodiment. During preproduction, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 can go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700 in FIG. 7.

In one illustrative example, components or subassemblies produced in component and subassembly manufacturing 706 in FIG. 7 can be fabricated or manufactured in a manner similar to components or subassemblies produced while aircraft 800 is in service 712 in FIG. 7. As yet another example, one or more apparatus embodiments, method embodiments, or a combination thereof can be utilized during production stages, such as component and subassembly manufacturing 706 and system integration 708 in FIG. 7. One or more apparatus embodiments, method embodiments, or a combination thereof may be utilized while aircraft 800 is in service 712, during maintenance and service 714 in FIG. 7, or both. The use of a number of the different illustrative embodiments may substantially expedite the assembly of aircraft 800, reduce the cost of aircraft 800, or both expedite the assembly of aircraft 800 and reduce the cost of aircraft 800.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A computer-implemented method for aircraft maintenance, comprising:

monitoring sections and components of an aircraft using sensors;

detecting, by the sensors, anomalies in the aircraft;

transmitting, responsive to the detection, real-time data from the sensors to a computer having an artificial intelligence (AI) algorithm;

analyzing the data with the AI algorithm to determine characteristics of the anomalies;

transmitting, in response to the determination, reports to a pilot and the computer;

utilizing the AI algorithm to analyze the reports to determine availability of a smart hangar for aircraft inspection; and responsive to a determination that a smart hangar is available, automatically preparing, by the smart hangar, smart inspection tools to inspect the aircraft upon arrival of the aircraft, wherein automatically preparing the smart inspection tools to inspect the aircraft further comprises positioning cameras on rails and loading flight plans into drones.

2. The method of claim 1, wherein the computer is based on the ground, in the cloud, in the aircraft or in a satellite.

3. The method of claim 1, wherein the AI algorithm utilizes the real-time data and historical information to determine the characteristics of the anomalies.

4. The method of claim 1, wherein the computer includes at least one of augmented reality (AR), mixed reality (MR) and digital twin technologies to assist in the analysis and interpretation of the anomalies.

5. The method of claim 1, wherein the sensors include at least one of piezoelectric sensors, Micro-Electro-Mechanical Systems (MEMS), Light Detection and Ranging (LIDARs), electromagnetic (EM) wave sensors, cameras, shearography sensors, and nanorobots.

6. The method of claim 1, wherein the characteristics of the anomalies include at least one of a type, location, size, and severity of the detected anomalies.

7. A system for aircraft maintenance, comprising:

a storage device configured to store program instructions; and one or more processors operably connected to the storage device and configured to execute the program instructions to cause the system to:

monitor sections and components of an aircraft using sensors;

detect, by the sensors, anomalies in the aircraft;

transmit, responsive to the detection, real-time data from the sensors to a computer having an artificial intelligence (AI) algorithm;

analyze the data with the AI algorithm to determine characteristics of the anomalies;

transmit, in response to the determination, reports to a pilot and the computer;

utilize the AI algorithm to analyze the reports to determine availability of a smart hangar for aircraft inspection; and responsive to a determination that a smart hangar is available, automatically prepare, by the smart hangar, smart inspection tools to inspect the aircraft upon arrival of the aircraft, wherein the program instructions to automatically prepare the smart inspection tools to inspect the aircraft further comprise instructions to position cameras on rails and load flight plane into drones.

8. The system of claim 7, wherein the computer is based on the ground, in the cloud, in the aircraft or in a satellite.

9. The system of claim 7, wherein the AI algorithm utilize the real-time data and historical information to determine the characteristics of the anomalies.

10. The system of claim 7, wherein the computer includes at least one of augmented reality (AR), mixed reality (MR) and digital twin technologies to assist in the analysis and interpretation of the anomalies.

11. The system of claim 7, wherein the sensors include at least one of piezoelectric sensors, Micro-Electro-Mechanical Systems (MEMS), electromagnetic (EM) wave sensors, cameras, shearography sensors and Light Detection and Ranging (LIDARs).

12. The system of claim 7, wherein the characteristics of the anomalies include at least one of a type, location, size and severity of the detected anomalies.

13. A computer program product for aircraft maintenance, comprising:

a computer-readable storage medium having program instructions embodied thereon to perform the steps of:

monitoring areas and sections of an aircraft using sensors;

detecting, by the sensors, anomalies in the aircraft;

transmitting, responsive to the detection, real-time data from the sensors to a computer having an artificial intelligence (AI) algorithm;

analyzing the data with the AI algorithm to determine characteristics of the anomalies; transmitting, in response to the determination, reports to a pilot and the computer;

utilizing the AI algorithm to analyze the reports to determine availability of a smart hangar for aircraft inspection; and responsive to a determination that a smart hangar is available, automatically preparing, by the smart hangar, smart inspection tools to inspect the aircraft upon arrival of the aircraft, wherein the instructions for automatically preparing the smart inspection tools to inspect the aircraft further comprise instructions for positioning cameras on rails and loading flight plane into drones.

14. The computer program product of claim 13, wherein the computer is based on the ground, in the cloud, in the aircraft or in a satellite.

15. The computer program product of claim 13, wherein the computer includes at least one of augmented reality (AR), mixed reality (MR) and digital twin technologies to assist in the analysis and interpretation of the anomalies.

* * * * *